United States Patent [19]

Noetzel

[11] Patent Number: 4,980,926

[45] Date of Patent: Dec. 25, 1990

[54] VOICE COMMUNICATION UNIT

[76] Inventor: Walter R. Noetzel, 2347 McGraw Street, Penticton, British Columbia, Canada, V2A 7W9

[21] Appl. No.: 294,000

[22] Filed: Jan. 5, 1989

[51] Int. Cl.[5] .............................................. H04B 10/00

[52] U.S. Cl. .................................... 455/617; 367/132; 381/188; 455/41

[58] Field of Search ...................... 455/41, 40, 66, 603, 455/602, 614, 617; 441/104–105, 124, 159; 381/188; 367/132

[56] References Cited

U.S. PATENT DOCUMENTS

| | | | |
|---|---|---|---|
| 3,267,414 | 8/1966 | Kritz | 367/132 |
| 3,540,442 | 11/1970 | Walker | 128/141 |
| 3,746,789 | 7/1973 | Alcivar | 179/1 VC |
| 3,867,715 | 2/1975 | Geil | 455/40 |
| 4,154,981 | 5/1979 | Dewberry et al. | 179/1 UW |
| 4,163,123 | 7/1979 | Brodsky et al. | 179/15 |
| 4,229,829 | 10/1980 | Brunwald | 455/600 |
| 4,446,375 | 5/1984 | Aird | 250/551 |
| 4,491,699 | 1/1985 | Walker | 455/89 |
| 4,508,936 | 4/1985 | Ingalls | 179/82 |
| 4,517,417 | 5/1985 | Murayama | 179/187 |
| 4,584,707 | 4/1986 | Goldberg et al. | 455/54 |
| 4,620,068 | 10/1986 | Wieder | 179/156 A |
| 4,654,883 | 3/1987 | Iwata | 455/89 |
| 4,685,133 | 8/1987 | Iggulden | 455/20 |
| 4,747,158 | 5/1988 | Goldberg et al. | 455/14 |
| 4,750,216 | 6/1988 | Boyce | 455/617 |
| 4,843,640 | 6/1989 | Juengel | 455/604 |

*Primary Examiner*—Joseph A. Orsino
*Assistant Examiner*—L. Van Beek
*Attorney, Agent, or Firm*—Venable, Baetjer & Howard

[57] ABSTRACT

A voice communication unit is mounted with respect to a full face mask to allow the wearer of the mask to communicate with others. An optical transmitter positioned inside the mask responds to the user's voice to transmit an optical signal through the face lens of the mask. A receiver located outside the mask and optically coupled to the transmitter is responsive to the optical signal and generates a sound corresponding to the user's voice. A timer in the transmitter limits the operating period of the communication unit. The receiver includes volume control circuitry for maintaining the generated sound to a relatively constant level.

32 Claims, 5 Drawing Sheets

VOICE COMMUNICATION UNIT

BACKGROUND OF THE INVENTION

The present invention relates generally to communication devices, and is specifically concerned with communication between persons wearing full face masks.

Typically, persons working in a hostile environment are required to wear full face masks in order to protect themselves against the hazards of the environment. These masks include full face mask respirators, self-contained breathing apparatus, and air supplied masks.

The object is to prevent the wearer of the mask from breathing in any harmful fumes from the environment. To this end, the face mask normally must be adequately sealed to prevent entrance of the harmful fumes into the mask. In addition, a positive pressure must be maintained at all times within the mask. In this way, if the mask is somehow punctured, the positive pressure within will force the air being supplied to the face mask to exit the mask through the puncture and, thereby, prevent the passage of harmful environmental air back through the puncture and into the mask.

Usually full face masks intended for use in hostile environments must be approved or certified by a government or other certifying body. For this approval to be granted, the face masks must comply with certain strict regulations that require that the masks undergo a series of tests to ensure the protection of the user. One such test verifies the sealing integrity of the mask. Once a mask has been approved, any changes made to the mask which effect the seal may require additional approval by the regulating body.

The mask when located over the face and mouth, however, typically causes diminished or disturbed communication between individual wearers of such masks often to the point where communication between the users is not possible. The mask seal while acting to block out the infiltrating harmful gas also invariably suppresses voice communication. Thus, an individual speaking while wearing a full face mask can not ordinarily be heard clearly by someone else.

Voice communication in such hostile environments is highly desirable and frequently necessary. It is known to provide the user with a microphone within the mask that is coupled to a speaker outside the mask. However, in order to connect the microphone to the speaker, the seal of the mask may be compromised. The fitting of pre-approved face masks with such a communication system would normally require new approval of the face mask. Considerable expense, however, can be involved in both the equipping of the existing pre-approved face masks with these prior art communication systems, and in obtaining new approvals for the masks. This expense has led to a work place setting where the use of noncommunication face masks is the standard. Workers typically rely on outdated visual signals which may be ineffective in environments where visibility is low.

SUMMARY OF THE INVENTION

The present invention is directed to the problem of providing ample means of communication between users of full face masks without affecting the sealing integrity of the masks.

In accordance with the invention, full face masks may be provided with a voice communication unit which includes an optical transmitter means positionable within the face mask and an optical receiver means positionable outside the face mask.

The transmitter means comprises a microphone responsive to the voice of the wearer of the mask to produce a voice signal, transmitter circuitry that converts the voice signal into an infra-red signal, and an infra-red transmitter that transmits the infra-red signal through the clear face portion of the mask. An infra-red receiver means optically coupled to the transmitter means through the mask face lens is responsive to the infra-red signal. The receiver means comprises a receiver which produces an electrical signal corresponding to the infra-red signal, receiver circuitry that converts the electrical signal to an audio signal, and a speaker responsive to the audio signal, that emits an audible signal corresponding to the voice of wearer. Other individuals in the room can then hear the speaker even if they too are wearing full face masks, as these face masks do not generally cover the ears.

Because the wearer's voice is optically transmitted through the medium of the mask face lens to the external speaker by infra-red energy rather than by a wire, the integrity of the face mask seal is not compromised. Further, any face mask already approved by a regulating body and equipped with the present invention would not ordinarily be subject to re-approval because the sealing integrity of the face mask structure and positive pressure of the mask is unchanged.

In one embodiment of the invention the transmitter means may be fitted to the well-known self-contained breathing apparatus sold under the trademark "SCOTT". The components of the transmitter means are set in a clear silicone sealant which is adhered to the clear face portion of the mask. The sealant does not react with the molecular structure of the mask, and the transmitter components are positioned without obstructing the view of the wearer.

In another embodiment, the transmitter means may be fitted to the well-known air masks sold under the tradename "MSA". Typically, these masks have existing side pockets into which certain of the transmitter means components may be placed. The remaining components including the microphone and the infra-red transmitter are pinned to existing excess mask material. As this excess material serves no essential purpose, the pinning of the microphone and transmitter thereto does not pose a sealing integrity degradation problem. Any proper airflow within the face mask is preserved.

In each of the aforementioned embodiments, the receiver means may be mounted in optical relationship with the transmitter means. The infra-red receiver may be enclosed in a protective suction cup and adhered to the external surface of the face mask opposite the point at which the infra-red transmitter is affixed. The receiver circuitry and speaker may be housed in a shielded unit which in turn is connected to the infra-red receiver by way of a break-away cable. The shielded unit may be clipped to the individual user's clothing, as for example his jacket.

Another aspect of the invention includes a method for communicating an audible sound through a transparent substrate. The audible sound is converted to an optical signal and transmitted through the substrate where it is then converted to a second audible sound corresponding to the first audible sound.

Other features of the invention include means for controlling the volume of the speaker and providing the unit with an auxiliary locator alarm.

In the specification when a full face mask is referred to, it is meant any of either a full face mask respirator, self-contained breathing apparatus, air supplied mask, or the like.

DESCRIPTION OF THE PREFERRED EMBODIMENT

Figure 1:
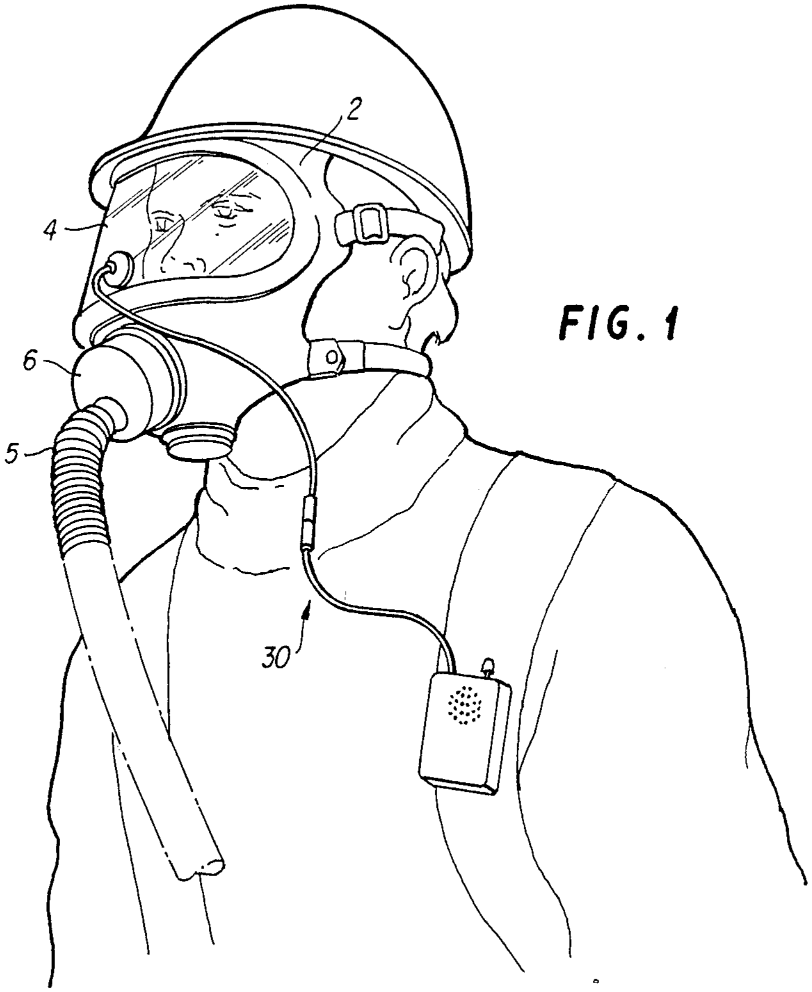
FIG. 1 is a fragmentary perspective view of a person wearing a full face mask employing the present invention. Only the receiver unit portion of the invention is visible.

Referring now to FIG. 1, a user 1 wearing a typical full face mask 2 is shown. The full face mask 2 has a regulator 6, breathing tube 5 connected to an air supply (not shown), and a transparent face lens 4. The full face mask 2 is provided with a communication device according to the present invention. Only the receiver unit 30 element of the device can be seen mounted outside the face mask 2. It is understood, however, that the transmitter unit is securely mounted within the face mask 2.

Figure 2:
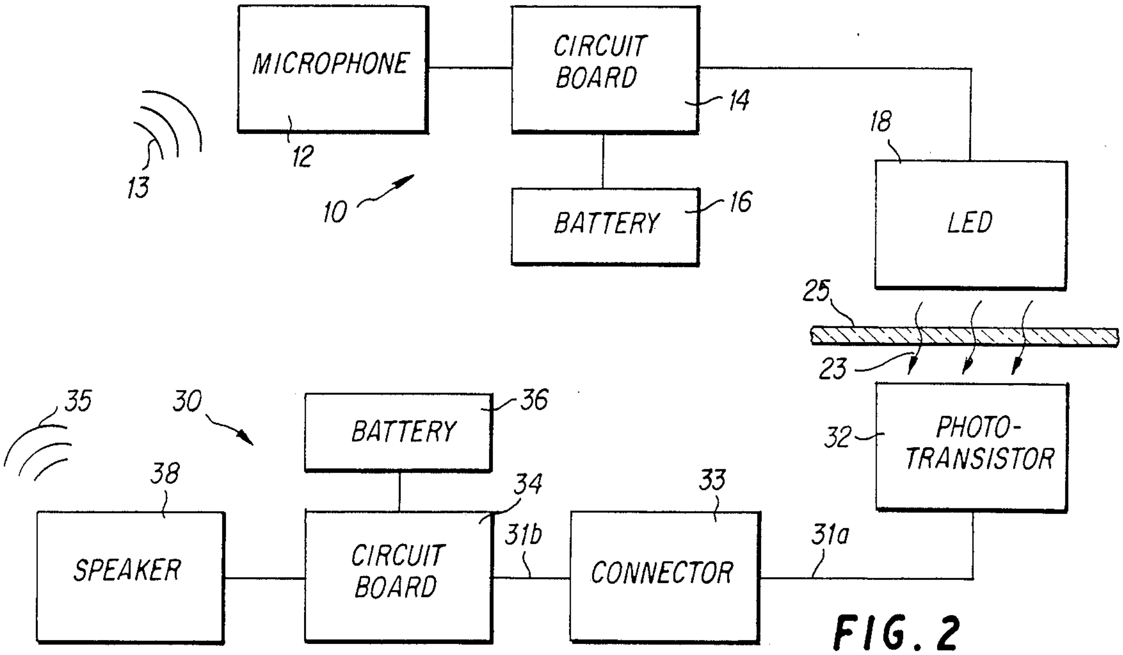
FIG. 2 is schematic block diagram of the communication unit in accordance with the present invention.

Although the communication device is generally described in conjunction with a full face mask, it is contemplated that the invention can be used to provide communication across any clear substrate. As shown in FIG. 2 the communication device is composed of two major parts, a transmitter unit 10 and a receiver unit 30. When in use, the transmitter unit 10 is placed on the side of the clear substrate 25 from which the audible sound 13 to be transmitted originates. The receiver unit 30, then, is positioned on the opposite side of the clear substrate 25 in optical relationship with the transmitter unit 10.

The transmitter unit 10 comprises a microphone 12, signal converting circuit board 14, battery 16, and infra-red transmitter 18. In the embodiment shown the infra-red transmitter 18 is a light emitting diode (LED) 18. The microphone 12 picks up the audible sound 13 and sends an electrical signal to the circuit board 14 which is powered by the battery 16. The signal from the circuit board 14 is amplified and sent to the infra-red transmitter 18 which emits infra-red light rays 23 that pass through the clear substrate 25. The rays 23 are received by the receiver unit 30 positioned on the opposite side of the clear substrate 25.

The receiver unit 30 includes a receiver 32, which in the embodiment shown is a phototransistor responsive to the infra-red light rays 23. Both the infra-red transmitter 18 and the infra-red receiver 32 are in confronting relationship on opposite sides of the clear substrate 25. A signal converting circuit board 34 is responsively coupled to the receiver 32 by way of a shielded cable 31*a*, 31*b* and a break-away connector 33. The circuit board 34 is powered by a battery 36. The output from the circuit board 34 is coupled to the speaker 38 which then broadcasts a sound 35 that corresponds to the audible sound 13 of the user.

In this way, the voice of the user can be transmitted across a clear substrate without materially affecting the seal integrity of that substrate. When used in conjunction with a full face mask, the communication unit will transmit infra-red light rays through the face lens 4 (FIG. 1) of the mask.

Figure 3:
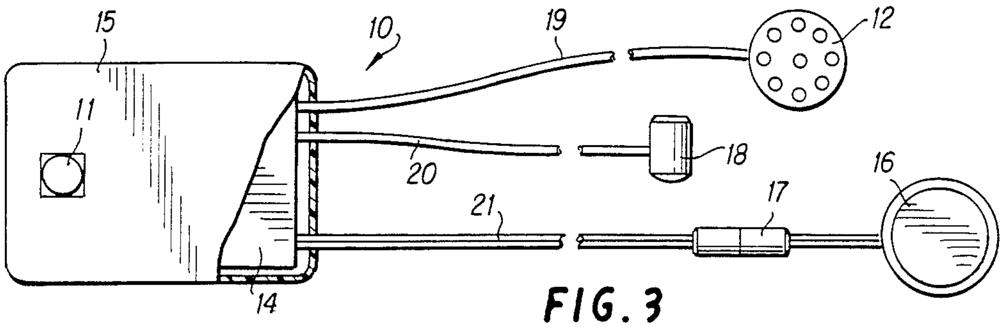
FIG. 3 is a simplified view of the transmitter unit of the present invention.

The transmitter unit 10 with its individual components is shown in more detail in FIG. 3. The circuit board 14 is sealed in a transmitter housing 15. The microphone 12, infra-red transmitter 18, and battery 16 are connected to the circuit board 14 in the housing 15 by their respective cables 19, 20, and 21. Battery cable 21 has a connector 17 for facilitating replacement of the battery 16. The components shown can, therefore, be situated to best accommodate the particular use of the transmitter.

In a preferred embodiment of the invention, all of the components of the transmitter unit 10 may be waterproofed by any known technique, for example epoxy potting. The purpose for having the transmitter components be waterproofed is that if they are mounted in a full face mask 2, they are likely to be subjected to immersion in water. For example, Government regulations normally require that the masks be cleaned after each use. The steps for cleaning often include submerging the mask in water. A transmitter unit mounted in the mask must therefore be able to withstand such procedure.

Figure 9:
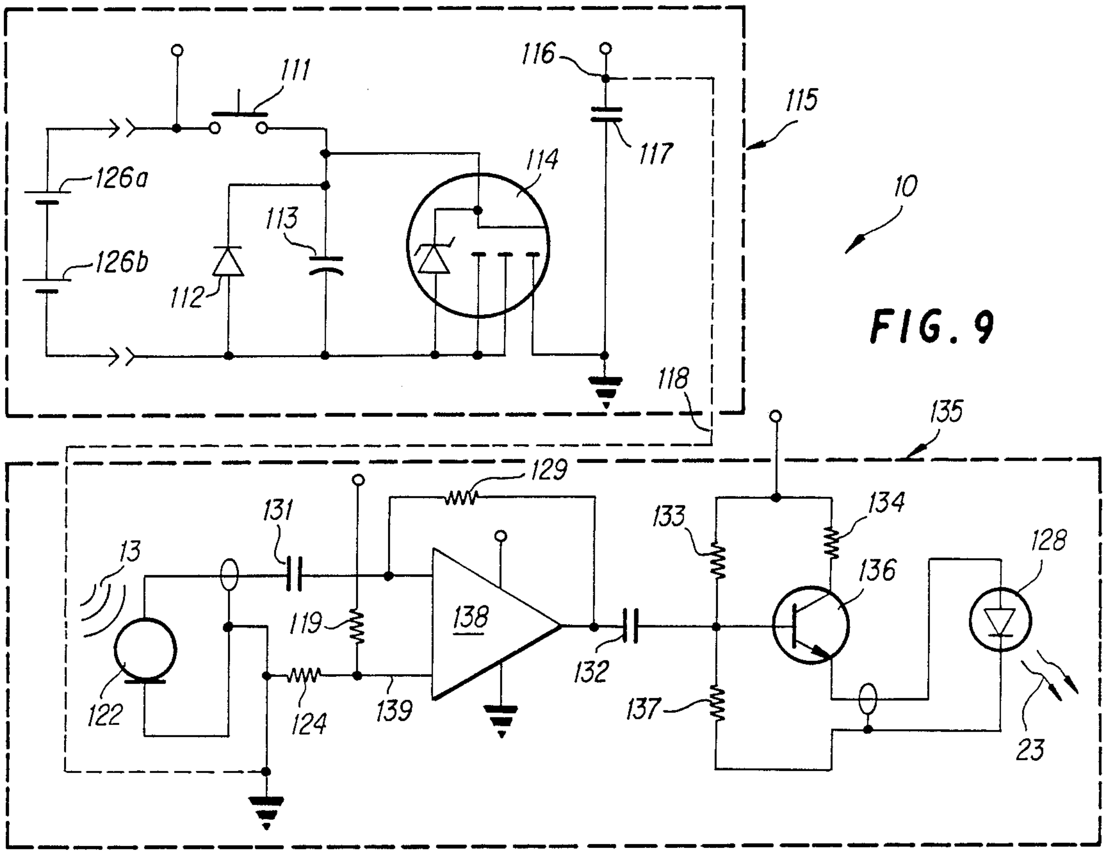
FIG. 9 is a schematic diagram of the transmitter circuitry.

The transmitter unit 10 has a timer switch 11 which activates a timer (not shown) within the housing 15. The timer, which is depicted in FIG. 9 and explained in more detail further below, allows the transmitter unit 10 to operate for a predetermined time period (e.g. 1 hour). Rather than have the transmitter unit 10 be voice activated, it is designed to continually operate for only a set period of time after manual activation in order to extend the life of the battery 16. A voice activated transmitter unit may draw power from the battery 16 even when the mask is not in use, for example, in response to extraneous noise. According to the present invention, while donning the mask, the user can actuate the switch 11, and the transmitter unit 10 will be operative for one hour. If after an hour, more time is needed, the switch 11 can be actuated again. During other periods when the unit 10 is not in use power is not drawn from the battery 16.

A one hour time span has been selected for the preferred embodiment because government regulations normally limit to such time worker exposure to hazardous areas. The predominant practice, however, is only one-half hour exposure. Furthermore, most breathing apparatus connected to the full face mask only have one hour supply with a small reserve. Consequently, the present invention contemplates a one hour operative period of time, it being clear that any period of time may be selected. In this way the timer also functions as a warning system to alert the user that he should leave the hazardous area when the speaker 38 no longer broadcasts sound 35.

Figure 4:
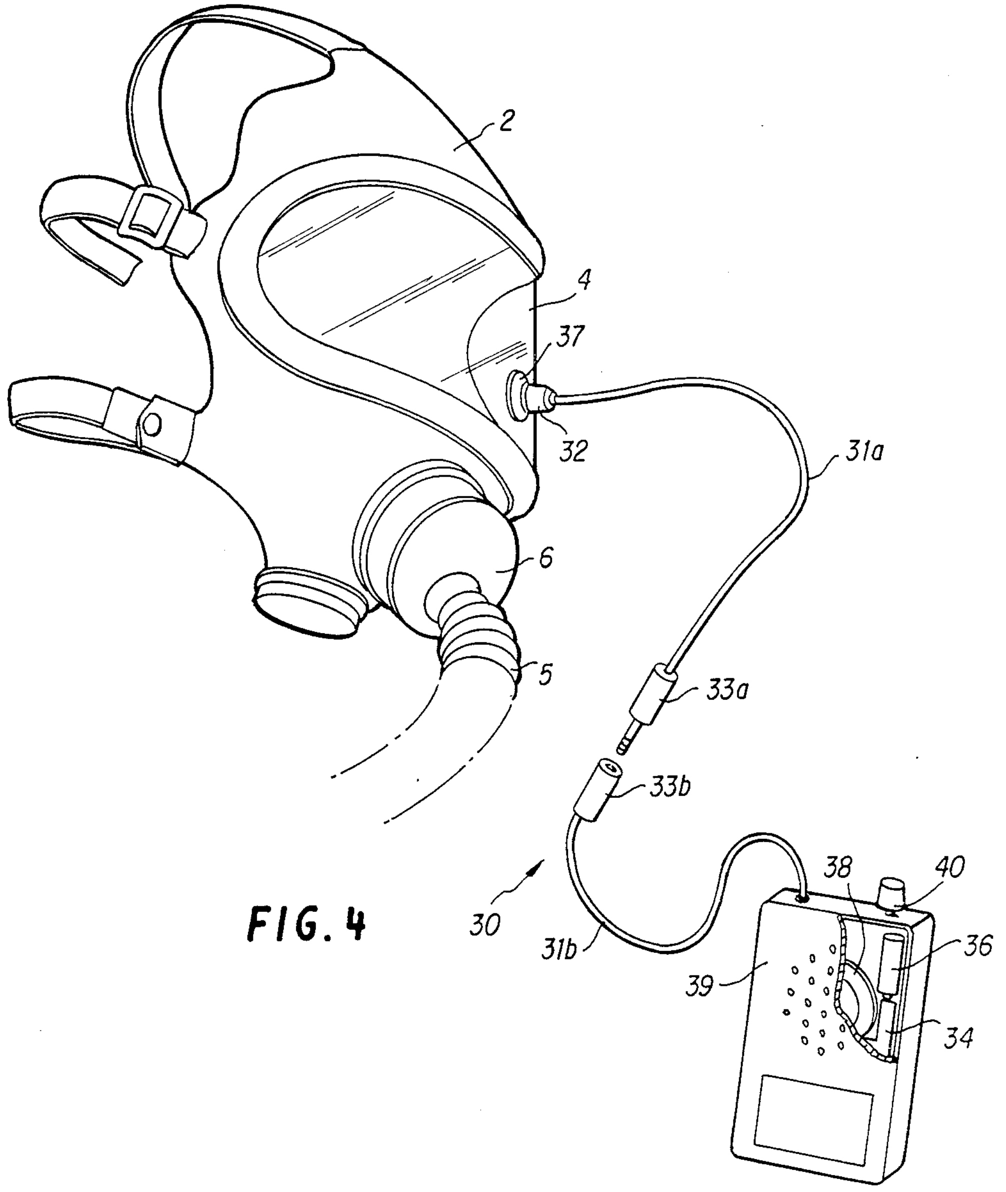
FIG. 4 is a simplified view of the receiver unit of the present invention, in contact with a typical full face mask.

FIG. 4 shows the receiver unit 30 in more detail, including its mounting configuration with respect to full face mask 2. The infra-red receiver 32 is housed in a protective suction cup 37 that in turn is adhered to the exterior of the lens 4 of the face mask 2. A sealant may be used to more securely affix the suction cup 37 to the lens 4. The infra-red receiver 32 and suction cup 37 should be placed in confronting relationship with the infra-red transmitter 18 (not shown).

Cables **31*a*, 31*b* and breakaway jacks 33*a*, 33*b* connect the infra-red receiver 32 to the receiver housing 39. When the jacks 33*a*, 33*b* are connected, the receiver circuit is complete, and power from the battery 36 supplies the receiver unit 30 thereby placing it in operative condition. When the jacks are disconnected, the receiver unit 30 cannot receive infra-red signals and convert them to audible sounds. In addition to functioning as an on/off switch for the receiver unit 30, the breakaway jacks 33*a* and 33*b* provide a safety feature. Should the shielded cable 31*a*, 31*b* become snagged on an object, the breakaway jacks 33*a* and 33*b* will detach and thus allow freedom of movement. Furthermore, the breakaway jacks 33*a*, 33*b*** will aid in the donning of the mask and associated gear.

Figure 10:
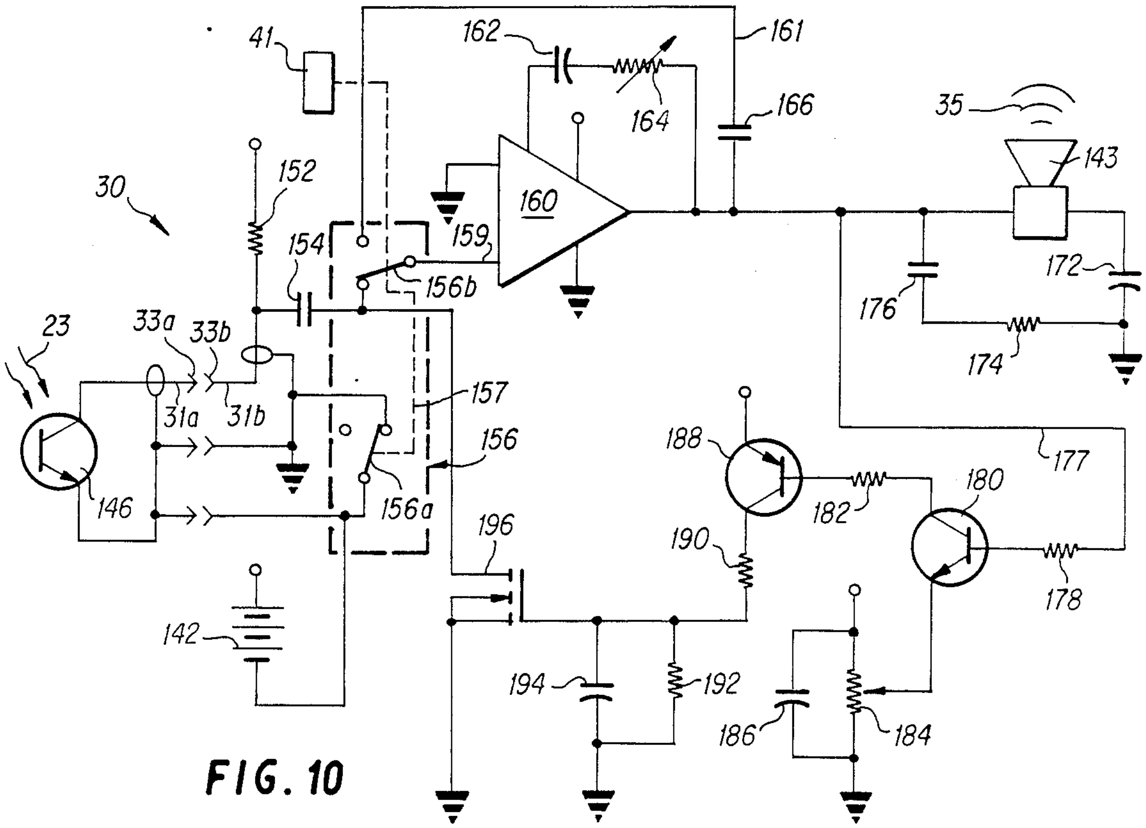
FIG. 10 is a schematic diagram of the receiver circuitry.

The housing 39 encloses the battery 36, the speaker 38, as well as the circuit board 34 which has a built in locator alarm circuit shown in FIG. 10. When an emergency arises, the user may activate the locator alarm by actuating the switch 40. An audible tone will then be placed on the speaker 38 thereby signaling others that the user is in distress. Switch 40 toggles the alarm on and off. Because the battery is directly coupled to the circuit board, the locator alarm can be operated even when the jacks **33*a* and 33*b*** are disconnected.

The receiver unit 30 has an automatic volume control which functions much like an automatic squelch. The circuitry of the receiver unit 30, illustrated in FIG. 10 is designed such that the volume level of the speaker 38 remains constant and undesirable feedback, primarily from the speaker 38, is eliminated. The automatic volume control can be set in the field to a desired level after which the circuitry in the receiver unit 30 will automatically maintain the volume level constant. A fuller description of the automatic volume control and other circuitry of the receiver unit 30 is provided further below.

Figure 5:
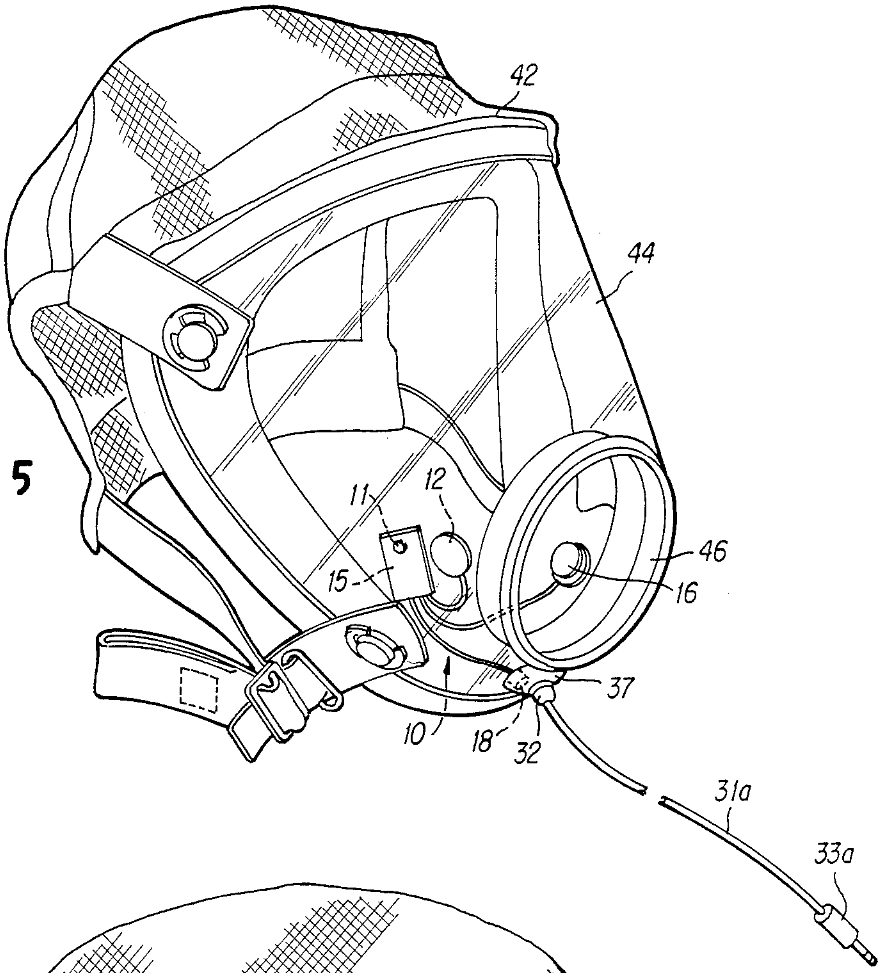
FIG. 5 is a perspective view of a full face mask sold under the trademark "SCOTT" with the transmitter unit and a portion of the receiver unit affixed thereto.

FIG. 5 illustrates a specific embodiment of the invention wherein the communication unit according to the present invention is mounted to the self-contained breathing apparatus sold under the trademark "SCOTT". For clarity only the transmitter unit 10 and those portions of the receiver unit 30 which are affixed to the full face mask 42 are shown.

The "SCOTT" mask 42 has a large conical-shaped lens 44 with a regulator 46 mounted at the apex. A breathing tube (not shown) connects the regulator to a supply of air. The transmitter unit 10 is fitted inside the mask 42 by setting the microphone 12, the transmitter housing 15, the battery 16, and the transmitter 18 in a silicone sealant which is adhered to the inside surface of the lens 44. The silicone sealant does not affect the molecular structure of the mask. Any suitable adhesive that does not react with the molecular structure of the mask could be used to affix the transmitter unit 10 thereto.

The transmitter unit 10 is positioned at a lower region of the lens such that the vision of the user is not obstructed. A positive pressure is maintained within the mask 42, and the overall sealing integrity is not affected. The infra-red transmitter 18 emits infra-red light directly through the medium of the lens 44. The infra-red receiver 32 is mounted on the exterior of the lens 44 directly opposite the infra-red transmitter 18. When the jack **33*a* is coupled to the rest of the receiver unit 40 (not shown in FIG. 5, but see FIG. 4**), the emitted light rays are received and converted into an audible sound.

Figure 6:
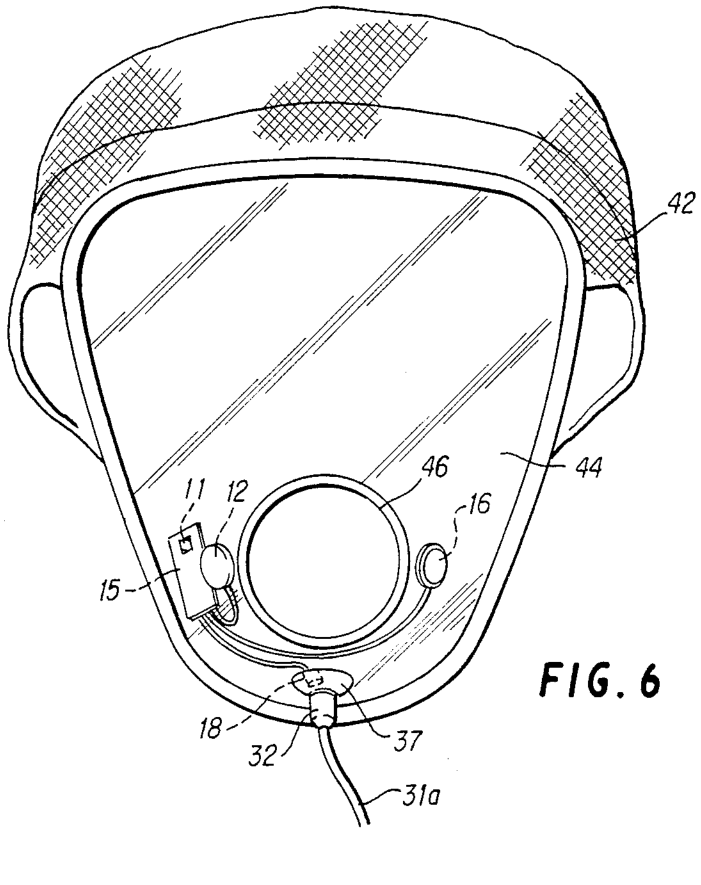
FIG. 6 is a front view of the apparatus shown in FIG. 5.

FIG. 6 is a front view of the "SCOTT" mask equipped with the transmitter unit 10 and a portion of the receiver unit 30. As can be seen, the transmitter unit components 12, 15, 16, 18, effectively, are wrapped around the lower portion of the lens 44. In practice, the user will activate the timer switch 11 before donning the mask 42. The user will then have a 1 hour operating period.

Figure 7:
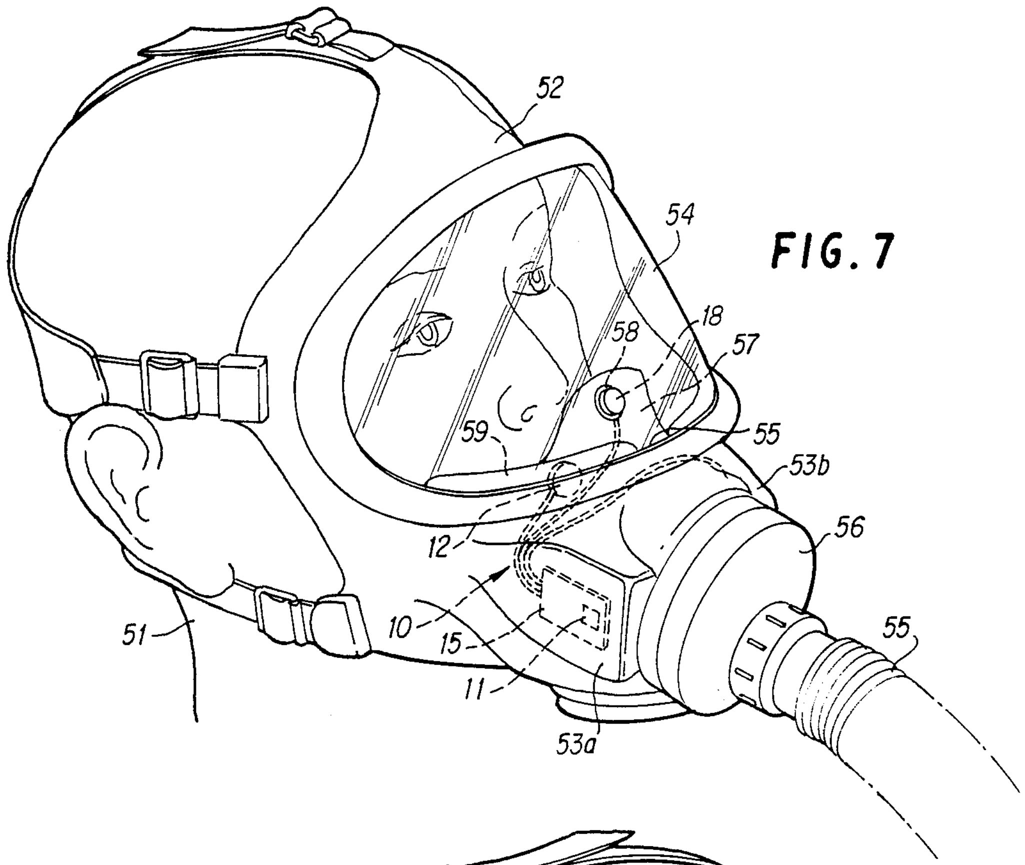
FIG. 7 is a side pictorial view of an MSA brand full face mask with the transmitter unit shown in phantom mounted thereto.
Figure 8:
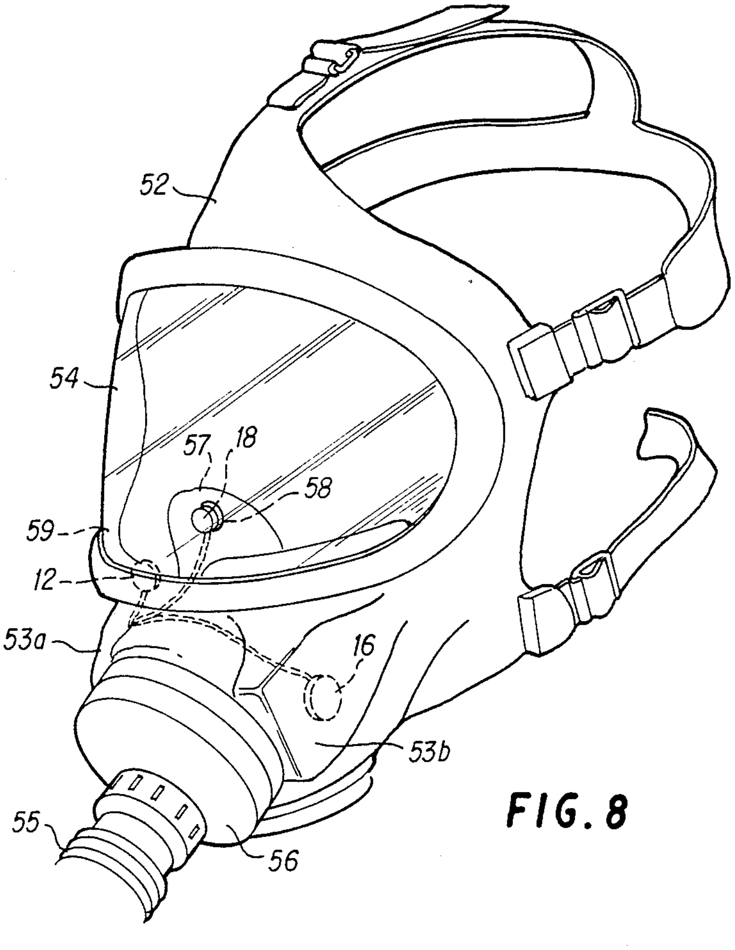
FIG. 8 is an opposite side pictorial view of the apparatus shown in FIG. 7.

FIG. 7 and FIG. 8 illustrate another embodiment of the invention wherein the communication unit according to the present invention is mounted to the self-contained breathing apparatus including a face mask 52 sold under the tradename "MSA". For clarity only the transmitter unit 10 mounted within the apparatus is shown.

The MSA mask 52 is made of a soft neoprene material with a plexiglass face lens 54. A breathing tube 55 supplies air from a source (not shown) to a regulator 56. The air then passes through existing internal pockets **53*a* and 53*b* to the user 51. The transmitter unit's housing 15 and the battery 16 are placed in respective side pockets 53*a* and 53*b*. Placement of these components in the pockets 53*a* and 53*b* does not affect the positive pressure within the mask nor the normal breathing of the user. Furthermore the sealing integrity of the mask 52** is not compromised.

The microphone 12 is pinned to excess neoprene seam material 59 in the MSA masks of the type used herein. A pin (not shown) connected to the microphone 12 is punched through the excess neoprene material 59 near where the mouth of the user 51 is during use and is held in place on the opposite side by a clasp (not shown). Any suitable clip, for example an alligator clip, could be used for attaching the microphone 12 to the excess material 59.

The MSA mask normally is manufactured with a baffle plate 57 attached near a point 55 where a lower portion of the lens 54 joins the neoprene material of the mask 52. The infra-red transmitter 18 is mounted to the baffle plate 57 by punching a hole 58 therein and inserting the transmitter 18 through the hole such that the infra-red light is transmitted through the face lens 54. The baffle plate 57 is normally biased against the lens 54, and, therefore, maintains the mounted infra-red transmitter 18 in confronting relationship with the receiver 32 (not shown).

In practice, the user 51 can activate the transmitter unit 10 either before or after donning the MSA mask. Because the pocket **53*a* where the transmitter housing 15 is placed is made from soft neoprene material, the switch 11 can be activated from outside of the mask 52** by pushing on it through the soft neoprene material.

FIG. 9 is a schematic diagram of the circuitry of the transmitter unit 10. A switch activated 1-hour timer 115 which controls the operation of the transmitter unit 10, comprises a momentary switch 111, a capacitor 113, MOSFET 114, diode 112, and capacitor 117. When the switch 11 on the transmitter unit (FIG. 3) is depressed, the circuit switch 111 momentarily completes the power connection between two series connected 3 volt lithium batteries 126*a* and 126*b* and the capacitor 113.

The momentary connection made by the switch 111 is sufficient to charge the capacitor 113. The charge is then sufficient to gate FET 114 on. The FET 114 acts as a switch to couple the battery 126*a*, 126*b* to the transmitter circuitry 135 via lead 118 for a certain period of time; thereafter the transmitter will shut off when the FET 114 is gated off. The diode 112 coupled to the capacitor 113 controls its decay time. The choice of capacitor 113, MOSFET transistor 114, and diode 112 determines the operating time for the transmitter unit.

The components of the signal converting and transmitting circuitry 135 include a crystal microphone 122 which receives voice sounds 13 of the user and transmits a corresponding audio signal to the remaining circuitry. The audio signal is coupled to ceramic coupling capacitor 131. The operational amplifier 138 is biased by the input resistors 119 and 124 and the feedback resistor 129. The timer 115 provides one input 139 to amplifier 138 via resistor 124 to enable the amplifier 138 while FET 114 is gated on. Output capacitor 132 AC couples the output signal of the operational amplifier 138 to driver transistor 136 which is appropriately biased by means of biasing resistors 133, 134 and 137. An infra-red light emitting diode 128 coupled to the output of the drive 136 emits an infra-red signal 23 corresponding to the original sound signal 13.

FIG. 10 is a schematic diagram of the circuitry of the receiver unit 30 which has two modes of operation. In the first mode the receiver unit 30 receives and converts infra-red signals 23 to audible sounds 35. In a second mode the receiver unit 30 operates a locator alarm. In the first mode the photo transistor 146 receives the infra-red signal 23 and converts it to an electrical signal which is then applied to the input 159 of operational amplifier 160 via coupling capacitor 154 which filters DC. The operational amplifier 160 amplifies the electrical signal to drive the speaker 143. The speaker 143 has parallel RC network including series connected capacitors 172, 176 and resistor 174.

A feedback loop 161 including capacitor 162 and variable resistor 164 is coupled across the operational amplifier 160. The feedback loop 161 controls the tone quality of the speaker 143. The variable resistor 164 can be adjusted and set to achieve a desired sound. A hole may be formed in the receiver unit housing, adjacent the potentiometer 164, to provide the access needed to make the adjustments desired.

The receiver circuitry 30 has a negative feedback loop 177 that functions as an autosquelch to automatically maintain the volume of the speaker 143 at a predetermined level, and to eliminate undesirable feedback. Transistor 180 drives the circuit loop 177 by amplifying the electrical signal in accordance with the setting of the parallel connected potentiometer 184 and capacitor 186. Transistor 188, responsive to the output of the transistor 180, gates field-effect transistor 196 which is coupled to the input 159 of the operational amplifier 160, thereby controlling its operating point such that the volume level remains relatively constant. Resistors 178, 182, 190, 192 and capacitor 194 further condition and filter the signal before it is applied to the operational amplifier 160.

According to the present invention, if the amplitude of the voice of the user is either too loud (or too soft), the feedback loop 177 adjusts the corresponding electrical signal to reduce (or increase) the input signal of the operational amplifier 160, which in turn drives the speaker 143. The volume level of sound 35 emitted by the speaker 143, therefore, remains constant regardless of the level of the voice input. The user can take the unit out to the field and manually adjust the potentiometers 164 and 184 to reach the desired tone and volume levels.

The electrical signal from the phototransistor 146 is coupled to the remaining circuitry through shielded cable 31*a* and 31*b* provided with breakaway jacks 33*a* and 33*b*. The first jack 33*a* is a mono jack and the second 33*b* is a stereo jack. They function as an on/off switch for the receiver unit 30.

When the jacks 33*a* and 33*b* are connected as shown in FIG. 10 and the receiver unit is receiving an infra-red signal, a circuit will be completed, and power is supplied from the battery 142. A double pole double throw switch 156 having two contact assemblies 156*a* and 156*b*, will be positioned as shown in FIG. 10. Contact 156*a* is in connection with its right pole, and contact 156*b* is in connection with its lower pole. The two contacts 156*a* and 156*b* are operatively coupled as illustrated by the dotted line 157.

Contact 156*a* functions as a monitor for the battery 142. When the jacks 33*a* and 33*b* are disconnected the contact 156*a* is positioned to the left to prevent power from being drawn from the battery 142. When the jacks are connected, contact 156*a* is positioned to the right in order to allow power to be drawn from the battery 142.

Contact 156*b* is operated when the manual locator alarm switch 40 is actuated. However in the normal operating mode i.e. when the alarm is not activated, contact 156*b* is in the down position as shown in FIG. 10. In this way, the electrical signal from the phototransistor 146 is coupled to operational amplifier 160.

The second mode of operation for the receiver unit concerns the locator alarm. When the locator alarm switch 40 is actuated, contact 156*b* moves to engage the upper pole and thereby operatively couple the feedback loop 161 to the operational amplifier 160. The feedback loop 161 has a capacitor 166 which causes the noise of the operational amplifier 160 to be AC coupled to its input 159 amplification whereby the speaker 143 is driven to produce a steady tone.

The following is a list of the parts contemplated for the transmitter and receiver circuitry:

| TRANSMITTER | | RECEIVER | |
|---|---|---|---|
| ITEM | DETAIL | ITEM | DETAIL |
| 111 | TINY SPST (Momentary pushbutton) | 33a | 1/8 MONO JACK |
| | | 33b | 1/8 STEREO JACK |
| 112 | 1N4148 (Diode) | 142 | ALK 9V (Alkaline Battery) |
| 113 | 6.8 TANT (Tantalum 16V Capacitor) | 143 | 8R.2W (2 in. Speaker) |
| 114 | VN10KM (MOSFET Transistor) | 146 | TIL414 (Phototransistor) |

-continued

| TRANSMITTER | | RECEIVER | |
|---|---|---|---|
| ITEM | DETAIL | ITEM | DETAIL |
| 117 | .1 MONO (Monolithic Capacitor) | 152 | 180K (Resistor) |
| 119 | 33K (Resistor) | 154 | .1 MONO (Capacitor) |
| 122 | XTAL (Crystal Microphone) | 156 | DPDT LOCK (Locking Pushbutton) |
| 124 | 33K (Resistor) | 160 | LM386N (Operational Amplifier) |
| 126a | LITH 3V (Lithium Battery) | 162 | 10u TANTALUM (Capacitor) |
| 126b | LITH 3V (Lithium Battery) | 164 | 1K (15 Turn PC Mount Potentiometer) |
| 128 | IR LED (Diode) | 166 | 470p MILITARY CERAMIC (Capacitor) |
| 129 | 470K (Resistor) | 172 | 220 16YLY (16V Electrolytic Capacitor) |
| 131 | .1 MONO (Capacitor) | 174 | 10K (Resistor) |
| 132 | .1 CERAMIC (Capacitor) | 176 | .1 CER (Capacitor) |
| 133 | 82K (Resistor) | 178 | 120K (Resistor) |
| 134 | 1K (Resistor) | 180 | PN2222A (Transistor) |
| 136 | 2N2222A (Transistor) | 182 | 100K (Resistor) |
| 137 | 39K (Resistor) | 184 | 20K (15 Turn PC Mount Potentiometer) |
| 138 | CA741CE (Operational Amplifier) | 186 | 220 16VLY (Capacitor) |
| | | 188 | 2N3906A (Transistor) |
| | | 190 | 470K (Transistor) |
| | | 192 | 220K (Transistor) |
| | | 194 | 10u TANT (Capacitor) |
| | | 196 | VN10KM (Transistor) |

The above-mentioned theory of operation of the circuitry is not intended to be limiting. Substitution of equivalent parts to achieve the described function of the circuitry is contemplated.

The present invention provides a simple, yet effective voice communication system whereby a user can communicate across a transparent substrate without materially affecting the substrate.

While the invention has been described in connection with specific embodiments, it is not limited thereto. Rather the invention covers any variations, uses or adaptations of the invention following, in general, the principles of the invention, and including such departures from the present disclosure as come within known and customary practice within the art to which the invention pertains.

What is claimed is:

1. A communication device for communicating an audible signal through a clear substrate in the form of a window on the face of a sealable face mask, comprising:
   - optical transmitter means positionable inside the face mask against said clear substrate for converting a first audible sound to an optical signal and transmitting said optical signal through said clear substrate;
   - optical receiver means positionable in confronting relationship with the transmitter means on the opposite side of the clear substrate for receiving said optical signal passed through said clear substrate and converting it to a second audible sound corresponding to said first audible sound; and
   - circuit means in said receiver means for adjusting the volume of the second audible sound to a generally constant level regardless of the volume level of the first audible sound.

2. A device according to claim 1, wherein in the optical transmitter means is waterproof.

3. A device according to claim 1, wherein said transmitter means comprises a microphone responsive to said first audible sound for producing a first electrical audio input signal that corresponds to said first audible sound, transmitter circuitry responsively coupled to said microphone for producing an electrical output signal, and an optical transmitter responsively coupled to said transmitter circuitry for producing said optical signal for transmission through said clear substrate.

4. A device according to claim 3 wherein said optical transmitter is an infra-red light-emitting diode.

5. A device according to claim 1, wherein said transmitter means includes timer means for maintaining said transmitter means in an operable condition for a predetermined period of time.

6. A device according to claim 5, wherein said timer means includes a manually operable switch for activating said timer means.

7. A device according to claim 1, wherein said transmitter means includes a self-contained power source for providing power thereto.

8. A device according to claim 1, wherein said receiver means includes a self-contained power source for providing power thereto.

9. A device according to claim 1, wherein said receiver means includes a locator alarm, for producing a third audible sound.

10. A device according to claim 9, wherein said locator alarm is manually activated.

11. A device according to claim 1, wherein said receiver means comprises an optical receiver capable of receiving said optical signal from said transmitter means, receiver circuitry responsively coupled to said optical receiver for producing a second electrical audio signal, and a speaker responsively coupled to said receiver circuitry for emitting the second audible sound corresponding to said second audio signal.

12. A device according to claim 11, wherein said optical receiver is a phototransistor.

13. A device according to claim 11, wherein said receiver means further comprises connector means for detachably connecting said optical receiver to said receiver circuitry.

14. A device according to claim 13, wherein said receiver means further comprises a power source, and said connector means includes a switch operatively connecting said power source to said receiver circuitry such that said receiver means is responsive to said optical signal.

15. A device according to claim 14, wherein said receiver means includes a locator alarm for producing a third audible sound emitted from said speaker independently of said switch.

16. A device according to claim 13, wherein said connector means comprises a cable connected at one end to said optical receiver and at its other end to said receiver circuitry, said cable including a break-away connector.

17. A communication device for use with a face mask having a transparent face portion comprising:

transmitter means, positioned inside said face mask, for transmitting through said transparent face portion an optical signal corresponding to a first audible sound generated by the wearer of the mask; and receiver means for receiving said optical signal outside of said face mask and generating a second audible sound corresponding to said first sound:

wherein said communication device is mounted with respect to said transparent face portion of the face mask such that it does not materially affect the seal integrity of the face mask.

18. A device according to claim 17 wherein said transmitter means includes an infra-red transmitter for transmitting said optical signal, said optical signal being in the infra-red band.

19. A device according to claim 17, wherein the face mask has internal pockets and said transmitter means is positionable within said pockets.

20. A device according to claim 17, wherein said receiver means comprises an optical receiver adhesively fixed to the exterior surface of the transparent face portion for receiving said optical signal.

21. A device according to claim 20, wherein said receiver means further comprises receiver circuitry connected to said optical receiver for converting said optical signal to said second audible sound and a speaker coupled to said receiver circuitry for emitting said second audible sound.

22. A device according to claim 21, further comprising a shielded cable having a break-away connector detachably connecting said optical receiver to said receiver circuitry.

23. A device according to claim 22, wherein said receiver means further comprises a power source coupled to said receiver circuitry, and said breakaway connector includes switch means for operatively connecting said power source to said receiver.

24. A device according to claim 23, wherein said receiver means includes a locator alarm for producing a third audible sound emitted from said speaker independently of said switch.

25. A device according to claim 17, further comprising volume control means for controlling the volume level of said second audible sound to a predetermined level.

26. A device according to claim 25, wherein said volume control means is operative for automatically maintaining said volume level at said predetermined level.

27. A device according to claim 17, further comprising timer means, said timer means when activated maintaining said communication means in operable condition for a predetermined time.

28. A method for communicating an audible sound through a transparent substrate forming a portion of a face mask having seal integrity for sealably protecting a wearer, comprising the steps of:

converting a first audible sound to an optical signal;

transmitting said optical signal through said transparent substrate;

receiving said optical signal after passage thereof through said transparent substrate without affecting the seal integrity of said face mask through said substrate; and converting said received optical signal to a second audible sound corresponding to the first audible sound.

29. A method for communicating an audible signal according to claim 28, further including the step of automatically controlling the volume level of said second audible signal to a predetermined level.

30. A method for communicating an audible signal according to claim 28, wherein said transparent substrate is a transparent face portion of said face mask and the first audible sound is generated by the wearer of the face mask while the face mask is in use.

31. A method for communicating an audible signal according to claim 30, further including the step of providing a locator alarm operable while the face mask is being used without affecting the seal integrity of the mask.

32. A method for communicating an audible signal according to claim 28, wherein the optical signal is in the infra-red band.

* * * * *